(12) United States Patent
Lu et al.

(10) Patent No.: US 10,459,428 B2
(45) Date of Patent: Oct. 29, 2019

(54) OPTIMAL CLOSED-LOOP INPUT DESIGN FOR IDENTIFICATION OF FLAT-SHEET PROCESS MODELS

(71) Applicant: Honeywell Limited, Mississauga (CA)

(72) Inventors: Qiugang Lu, Vancouver (CA); Bhusban Gopaluni, Vancouver (CA); Michael Forbes, North Vancouver (CA); Philip Loewen, North Vancouver (CA); Johan Backstrom, North Vancouver (CA); Guy Dumont, Vancouver (CA)

(73) Assignee: Honeywell Limited, Mississauga (CA)

( * ) Notice: Subject to any disclaimer, the term of this patent is extended or adjusted under 35 U.S.C. 154(b) by 167 days.

(21) Appl. No.: 15/273,710

(22) Filed: Sep. 23, 2016

(65) Prior Publication Data

US 2017/0261963 A1    Sep. 14, 2017

Related U.S. Application Data

(60) Provisional application No. 62/305,412, filed on Mar. 8, 2016.

(51) Int. Cl.
   G05B 19/4097    (2006.01)

(52) U.S. Cl.
   CPC ............ *G05B 19/4097* (2013.01); *G05B 2219/40148* (2013.01); *G05B 2219/45234* (2013.01)

(58) Field of Classification Search
   CPC combination set(s) only.
   See application file for complete search history.

(56) References Cited

U.S. PATENT DOCUMENTS

| | | |
|---|---|---|
| 4,916,615 A | 4/1990 | Chittineni |
| 5,566,134 A | 10/1996 | Dufault |
| 5,758,047 A | 5/1998 | Lu et al. |

(Continued)

OTHER PUBLICATIONS

PCT search report and written opinion for PCT/CA2017/000035 dated May 19, 2017.

(Continued)

*Primary Examiner* — Kenneth M Lo
*Assistant Examiner* — Chad G Erdman
(74) *Attorney, Agent, or Firm* — Charles H Jew

(57) ABSTRACT

Sheetmaking cross-directional (CD) control requires a sophisticated model-based controller whose operation requires an accurate model of process behavior, but due to the complexity of the process, identifying these process models is challenging. Current techniques rely on open-loop process experimentation. Using non-causal scalar transfer functions for the steady-state CD process model and controller model avoid the problem of large dimensions associated with the CD process. These non-causal transfer functions can be represented by causal transfer functions that are equivalent to the non-causal ones in the sense of the output spectrum. A closed-loop optimal input design framework is proposed based on these causal equivalent models. CD actuators have responses in both sides along the cross direction which can be viewed as a non-causal behavior. Techniques to perform the non-causal modeling are demonstrated and developed in a closed-loop optimal input design framework based on non-causal modeling of the closed-loop CD process.

20 Claims, 4 Drawing Sheets

(56) References Cited

U.S. PATENT DOCUMENTS

| | | | |
|---|---|---|---|
| 6,086,237 A | 7/2000 | Gorinevsky et al. | |
| 6,807,510 B1 | 10/2004 | Backstrom et al. | |
| 7,454,253 B2 | 11/2008 | Fan | |
| 7,459,060 B2 | 12/2008 | Stewart | |
| 7,577,483 B2 | 8/2009 | Fan et al. | |
| 7,650,195 B2 | 1/2010 | Fan et al. | |
| 7,820,012 B2 | 10/2010 | Stewart | |
| 8,185,217 B2 | 5/2012 | Thiele | |
| 8,200,346 B2 | 6/2012 | Thiele | |
| 8,224,476 B2 | 7/2012 | Chu et al. | |
| 9,122,261 B2 | 9/2015 | Lu | |
| 2006/0111858 A1 | 5/2006 | Zhu | |
| 2007/0239310 A1* | 10/2007 | Fan | G05B 13/048 700/129 |
| 2013/0041482 A1 | 2/2013 | Badwe et al. | |
| 2013/0262019 A1* | 10/2013 | Chu | B65H 23/032 702/123 |
| 2014/0358254 A1 | 12/2014 | Chu et al. | |
| 2015/0268645 A1 | 9/2015 | Shi et al. | |
| 2015/0330022 A1* | 11/2015 | Fu | G05B 17/02 700/128 |
| 2016/0041536 A1 | 2/2016 | Benosman et al. | |
| 2016/0378073 A1* | 12/2016 | Forbes | G05B 13/021 700/52 |

OTHER PUBLICATIONS

Kim et al, "Convex relaxation of sequential optimal input design for a class of structured large-scale systems: Process gain estimation" in Proceeding of the Am. Control Conference, Washington D.C. pp. 3906-3911, 2013.

Gopaluni et al, "Identification of symmetric noncausal processes: Cross-directional response modeling of paper machines," in Proceeding of the 45th IEEE Conference on Decision and Control, San Diego, CA pp. 6744-6749, 2006.

Chu et al, "Intelligent closed-loop CD alignment, " in Proceeding of the Control Systems, Stockholm, Sweden, pp. 161-166, 2010.

* cited by examiner

The closed-loop optimal input design configuration.

The impulse response of a single actuator (solid line) and the impulse response of the estimated noncausal transfer function (dash-dotted line).

The impulse responses of the estimated process model in the closed-loop under the optimally designed input (Fig. 3A) and the bumped input (Fig. 3B) in 100 Monte-Carlo simulations.

OPTIMAL CLOSED-LOOP INPUT DESIGN FOR IDENTIFICATION OF FLAT-SHEET PROCESS MODELS

REFERENCE TO RELATED APPLICATION

This application claims priority to U.S. Provisional Patent Application No. 62/305,412 that was filed on Mar. 8, 2016 and which is incorporated herein by reference.

FIELD OF THE INVENTION

The present invention generally relates to monitoring and controlling continuous sheetmaking systems using model-based controllers and more specifically to techniques for identifying suitable process models by generating good quality process data while the system is operating in closed-loop.

BACKGROUND OF THE INVENTION

The paper machine is a large-scale process to convert fibers into sheets of paper with high efficiency. It has hundreds of actuators at the head along the cross direction to control the properties of the pulp on the paper sheet. Thousands of measurement boxes are located at the end to measure the paper properties. For the controller design, there are two important directions associated with the paper machine: machine direction (MD) and cross direction (CD). The MD refers to the direction in which the paper sheet moves while the CD is the direction perpendicular to the MD.

Apart from the large number of actuators and measurement bins, the CD process is also an ill-conditioned process. Besides, the CD process model suffers from large uncertainties. All of these characteristics add to the complexity associated with the corresponding model identification and controller design. A common technique to address this issue assumes that all the actuators have identical temporal (in the time direction) and spatial (in the CD) response behavior. Moreover, the temporal and spatial responses are assumed to be separable. These assumptions are valid in practice and make the CD process easier to handle. Even then, the controller design and model identification for the CD process are still challenging.

A current control employed in the CD process is model predictive control (MPC) that requires a model with good quality. Therefore, model identification for the CD process plays an essential role in determining the performance of the MPC. In terms of the system identification, it is well known that a good excitation signal is necessary to make the identified model reliable and precise. How to design the excitation signal in an optimal way has received extensive attention. A number of well-known strategies have been proposed such as the frequency domain approach, time domain approach, open-loop optimal input design and closed-loop optimal input design.

In terms of the optimal input design for the CD process, most existing results focus on the open-loop case to generate good data for process model identification, which risks interrupting normal process operations and sacrificing quality. The main drawback is that it may bring significant profit loss for the mills as the normal operations are interrupted. The industry needs a technique that can generate good quality process data without having to suspend control and without sacrificing product quality.

SUMMARY OF THE INVENTION

The present invention simplifies the optimal design of process experiments for closed-loop CD process identification by using a causal equivalent process model to find the optimal spatial input spectrum subject to input and output power constraints. The technique includes converting the current or nominal process model from a large matrix to a non-causal transfer function. This reduces the number of parameters in the model, but puts it in a form that is difficult to use for optimal input design. Next, the non-causal model is converted into a causal model that has an equivalent output spectrum, which puts the model into a simple form that can be used for optimal input design. The causal model is then implemented to design the optimal input spectrum. This optimal input spectrum indicates how much input excitation should exist at each frequency to have an optimal experiment (one that generates the data from which we can obtain a process model estimate with the smallest uncertainty). Finally, the frequency domain representation of the optimal experiment is converted to a time domain realization, that is, a series of perturbations to the sheetmaking process that will generate the required informative data.

In one aspect, the invention is directed to a method of closed-loop identification of process models for a model predictive controller (MPC) for an industrial sheetmaking system having a plurality of actuators arranged in the cross-direction (CD) wherein the MPC provides control for a spatially-distributed sheet process which is employed in the sheetmaking system. The method includes the steps of:

(a) selecting a process model for the spatially-distributed process wherein the process model is defined by a matrix. The matrix defines the steady-state gains between actuator positions and spatially distributed process measurements. This model form is particularly convenient for use with the MPC. The initial process model selection may be based on use of an existing process model that is not as accurate as desired or it may be based on some a priori information about the process whereby the point of the initial model is to allow for the design of an excitation sequence that is tailored to a specific process of interest.

(b) converting the matrix into a non-causal transfer function. The non-causal spatial finite impulse response model is generated by taking the parameters from a single column of a spatial gain matrix and the non-causal spatial impulse response model is factored into a causal transfer function and an identical but anti-causal transfer function.

(c) converting the non-causal transfer function into a causal model that has an equivalent spectrum. This is preferably accomplished by taking the square (squaring) of the causal factor of the non-causal transfer function.

(d) using the causal model to design an optimal input spectrum for process excitation. The input spectrum is designed to minimize the covariance of the non-causal process model parameters subject to constraints on input and output power. To solve this optimization problem, a finite dimensional parameterization of the spectrum is made which allows the problem to be solved by readily available optimization toolboxes.

(e) transforming a frequency domain representation of the optimal input spectrum to a time domain realization which is a sequence of actuator movements. A controllable and observable state space realization of the spectrum can be constructed using established techniques.

(f) applying the sequence of actuator movements to the plurality of actuators and collecting data regarding changes in cross-directional sheet properties due to the sequence of actuator movements to determine measured actuator response profiles.

(g) analyzing the data to extract new model parameters.

(h) and inputting the new model parameters for the process model.

In another aspect, the invention is directed to a multivariable model predictive controller (MPC) for providing control to a cross-direction (CD) process having at least one manipulated actuator array and at least one controlled measurement array, wherein the MPC employs a process model that is defined by a matrix and the MPC includes a processor that is configured to:

convert the matrix into a non-causal transfer function;

convert the non-causal transfer function into a causal model that has an equivalent spectrum;

use the causal model to design an optimal input spectrum for process excitation;

transform a frequency domain representation of the optimal input spectrum to a time domain realization which is a sequence of actuator movements;

apply the sequence of actuator movements to the plurality of actuators and collecting data regarding changes in cross-directional sheet properties due to the sequence of actuator movements to determine measured actuator response profiles;

analyze the data to extract new model parameters; and input the new model parameters for the process model.

The present invention is particularly suited for so-called "single-beam" applications for identifying suitable process models for the MPC with respect to a single actuator array comprising of a plurality of manipulated actuators that are arranged in the CD and a corresponding single controlled measurement array.

DETAILED DESCRIPTION OF PREFERRED EMBODIMENTS

Figure 1:
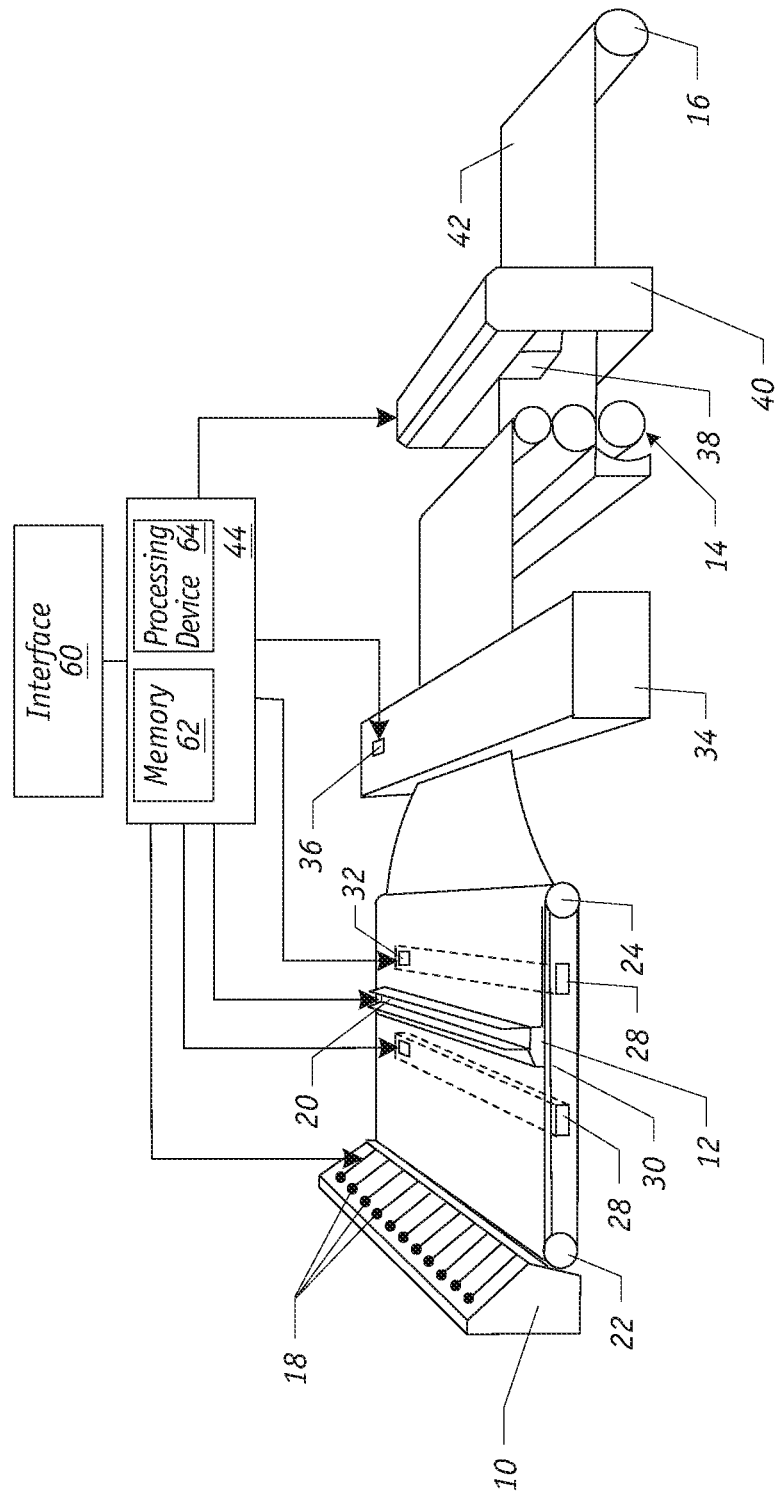
FIGS. 1, 2, and 3 are schematic illustrations of a papermaking system.

As shown in FIG. 1, a system for producing continuous sheet material includes various processing stages such as headbox 10, steambox 12, a calendaring stack 14 and reel 16. The array of actuators 18 in headbox 10 controls the discharge of wet stock (or feedstock) material through a plurality of slices onto supporting web or wire 30 which rotates between rollers 22 and 24. Similarly, actuators 20 on steambox 12 can control the amount of steam that is injected at points across the moving sheet. Sheet material exiting the wire 30 passes through a dryer 34 which includes actuators 36 that can vary the cross directional temperature of the dryer. A scanning sensor 38, which is supported on supporting frame 40, continuously traverses and measures properties of the finished sheet in the cross direction. The finished sheet product 42 is then collected on reel 16. As used herein, the "wet end" portion of the system includes the headbox, the web, and those sections just before the dryer, and the "dry end" comprises the sections that are downstream from the dryer. Typically, the two edges of the wire in the cross direction are designated "front" and "back" (alternatively, referred as the "high" and "low") with the back side being adjacent to other machinery and less accessible than the front side.

The system further includes a profile analyzer 44 that is connected, for example, to scanning sensor 38 and actuators 18, 20, 32 and 36 on the headbox 10, steam box 12, vacuum boxes 28, and dryer 34, respectively. The profile analyzer is a computer which includes a control system that operates in response to the cross-directional measurements from scanner sensor 38. In operation, scanning sensor 38 provides the analyzer 44 with signals that are indicative of the magnitude of a measured sheet property, e.g., caliper, dry basis weight, gloss or moisture, at various cross-directional measurement points. The analyzer 44 also includes software for controlling the operation of various components of the sheetmaking system, including, for example, the above described actuators. To implement to the control system of the present invention, analyzer 44 can include memory 62 and processing devices 64 to execute software/firmware instructions for performing various operations related to MPC control of an industrial process. Interface 60 allows processing devices to receive data and provide signals to actuators or controllers.

Figure 2:
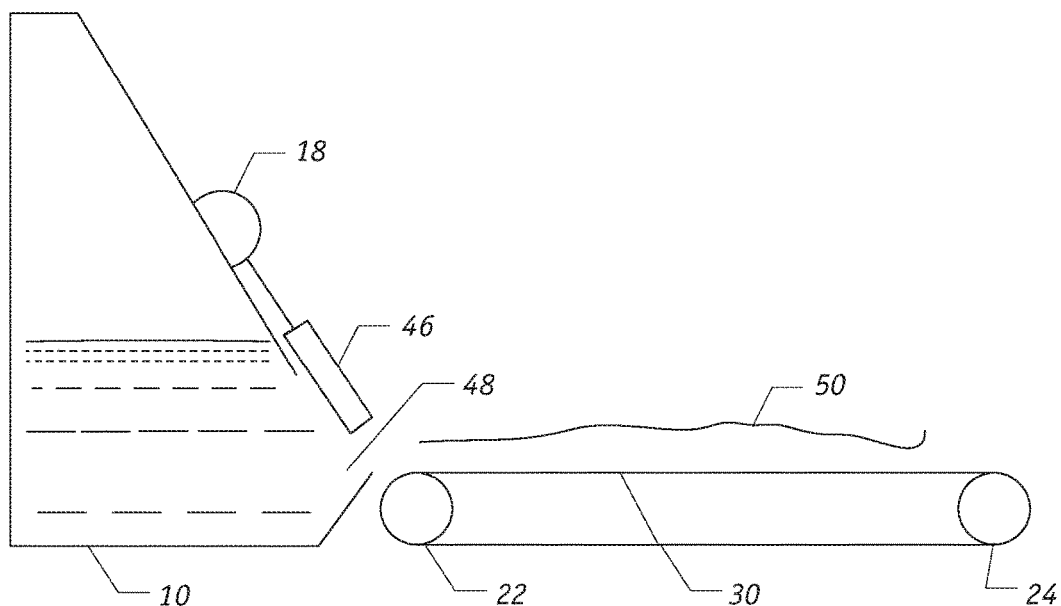

FIG. 2 depicts a slice lip control system which is mounted on a headbox 10 for controlling the extent to which a flexible slice lip member 46 extends across the discharge gap 48 at the base of the headbox 10. The slice lip member 46 extends along the headbox 10 across the entire width of the web in the cross-direction. The actuator 18 controls of the slice lip member 46, but it should be understood that the individual actuators 18 are independently operable. The spacing between the individual actuators in the actuator array may or may not be uniform. Wetstock 50 is supported on wire 30 which rotates by the action of rollers 22 and 24.

Figure 3:
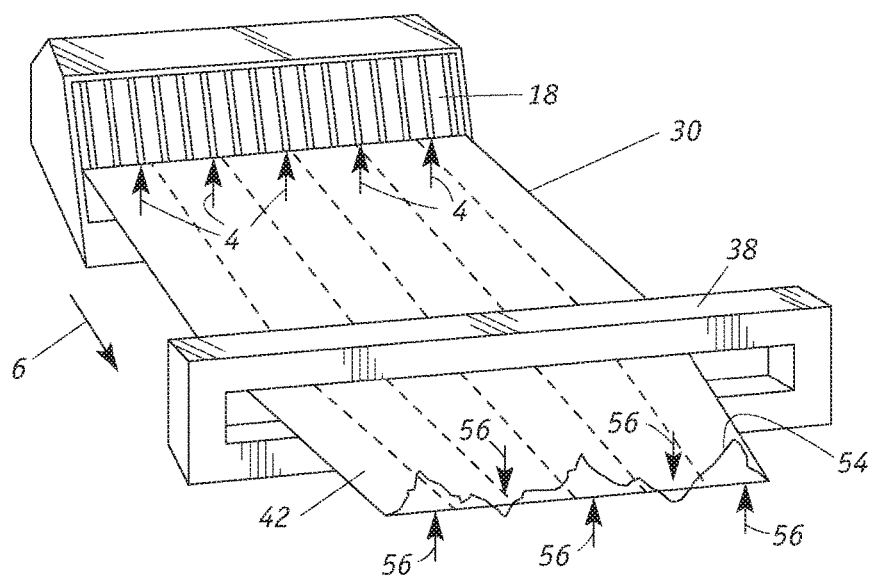

As an example shown in FIG. 3, the amount of feedstock that is discharged through the gap between the slice lip member and the surface of the web 30 of any given actuator is adjustable by controlling the individual actuator 18. The feed flow rates through the gaps ultimately affect the properties of the finished sheet material, i.e., the paper 42. Specifically, as illustrated, a plurality of actuators 18 extend in the cross direction over web 30 that is moving in the machine direction indicated by arrow 6. Actuators 18 can be manipulated to control sheet parameters in the cross direction. A scanning device 38 is located downstream from the actuators and it measures one or more the properties of the sheet. In this example, several actuators 18 are displaced as indicated by arrows 4 and the resulting changes in sheet property is detected by scanner 38 as indicated by the scanner profile 54. By averaging many scans of the sheet, the peaks of profile 54 indicated by arrows 56 can be determined. This type of operation is typically used in traditional open and closed-loop bump tests. In contrast, the inventive reverse bump test does not directly send perturbations to the actuator profile. It should be noted that besides being positioned in the headbox, actuators can be placed at one or more strategic locations in the papermaking machine including, for example, in the steamboxes, dryers, and vacuum boxes. The actuators are preferably positioned along the CD at each location.

It is understood that the inventive technique is sufficiently flexible as to be applicable for online implementation with any large-scale industrial multiple actuator array and multiple product quality measurements cross-directional process that is controlled by a single-input-single-output (SISO) controller or by a multivariable model predictive controller (MPC) such as in papermaking. Suitable paper machine processes where paper is continuously manufactured from wet stock are further described, for instance, in U.S. Pat. No. 6,807,510 to Backstrom et al., and U.S. Pat. No. 8,224,476 to Chu et al., and U.S. 2015/0268645 to Shi et al., which are incorporated herein by reference. In so-called "bump" tests operating parameters on the sheetmaking system, such as a papermaking machine, are altered and changes of certain dependent variables resulting therefrom are measured. Bump tests techniques are described, for open-loop CD process model estimation, in U.S. Pat. No. 6,086,237 to Gorinevsky et al. and, for closed-loop CD process alignment identification, in U.S. Pat. No. 7,459,060 to Stewart, which are incorporated herein by reference. While the invention will be described with respect to a papermaking machine, it is understood that the invention is applicable to other spatially-distributed processes such as plastic sheetmaking, rubber sheetmaking, and sheet metal operation.

The invention will be illustrated with a closed-loop input design for the CD process. Since most of time the closed-loop CD process is operating at steady-state, the preferred process will be on the steady-state closed-loop CD process. The main challenges are how to deal with the large input-output dimensions of the process and how to incorporate the controller in order to perform the closed-loop optimal input design. With the present invention, a non-causal model for the CD process is developed to avoid the high dimensional issue associated with the conventional Multi-input-multi-output (MIMO) CD model. To eliminate the resultant difficulty for the input design, we then propose an approach to obtain a causal model with an equivalent output spectrum as the non-causal model. It is shown that the maximum likelihood estimate and the parameter covariance matrix of the causal-equivalent model will converge to those of the non-causal model asymptotically with probability one. In this sense, the optimal excitation signal can be designed directly based on the causal model.

I. CD Processes and the Steady-State Model
A. Open-loop CD Process Model

In the following CD process model that includes controller 70 and plant 72 shown in FIG. 4, $$y(t)=g(z^{-1})Gu(t)+v(t), \quad (1)$$

$y(t) \in \mathbb{R}^m$ represents the measured controlled variable (CV) profile, and m is the number of the measurement boxes along the cross direction. $u(t) \in \mathbb{R}^m$ is the manipulated variable (MV) profile and here we assume a square CD model. $v(t) \in \mathbb{R}^m$ is the disturbance acting on the output of the process. $z^{-1}$ is the unit backward-shift operator. $g(z^{-1})$ is used to describe the dynamics associated with each actuator and is assumed to be a scalar transfer function. In other words, we assume that all the actuators share the same dynamics, which is a common practice to simplify the modeling of the process. $G \in \mathbb{R}^{m \times m}$ is the steady-state gain matrix and each column of G matrix is indeed the sampled impulse response of a single actuator along the CD at steady-state. The most distinguished features of G are its ill-conditionality, Toeplitz structure and sparsity. These characteristics greatly reduce the complexity of the controller design and model identification of the CD process. For clarity, we pose the following assumption on the structure of G matrix.

Assumption 1. The actuators of the CD process have the same and symmetric impulse response shape along the spatial direction at steady-state, except the center of the response shape of each actuator is different. The columns of G are indeed sampled version of these responses.

For the dynamic model, we assume $g(z^{-1})$ to have the following form (the subscript t represents temporal), $$g(z^{-1}) = z^{-d} \frac{B_t(z^{-1})}{A_t(z^{-1})} \quad (2)$$

where d is the time-delay. $B_t(z^{-1})$ and $A_t(z^{-1})$ are polynomials and mostly $g(z^{-1})$ is the discretization of a first-order plus time-delay model with unit gain. Similarly, the output disturbance v(t) is assumed to be filtered white noise, both temporally and spatially, $$v(t) = \frac{D_t(z^{-1})}{C_t(z^{-1})} \phi e(t) \quad (3)$$

where $C_t(z^{-1})$ and $D_t(z^{-1})$ are monic and scalar polynomials describing the filter in the temporal direction. Again, here we assume the disturbances affecting all the output channels have the same dynamic model. The constant matrix $\phi \in \mathbb{R}^{m \times m}$ denotes the spatial correlation of the noise. e(t) is the white noise with zero mean and covariance $\mathbb{E}[e(t)e^T(t_0)] = \Sigma_e \delta(t-t_0)$, where $\mathbb{E}$ is the expectation operator, $\Sigma_e$ is the co-variance matrix and $\delta$ is the Dirac delta function.

For the purpose of spatial optimal excitation signal design, the following steady-state CD process model is of interest, $$y_{ss} = G_{ss} u_{ss} + v_{ss}, \quad (4)$$

where $y_{ss} \in \mathbb{R}^m$ is the steady-state measured CV profile, and $u_{ss} \in \mathbb{R}^m$ is the steady-state MV profile. $G_{ss} = G$ is the steady-state process gain. $v_{ss} \in \mathbb{R}^m$ is the steady-state output disturbance. For convenience, we suppose that the spatial filter $\phi$ is also Toeplitz-structured and sparse as $G_{ss}$.

B. Closed-loop Steady-state CD Process Model

It is well-known that the closed-loop dither signal design will involve the explicit expression of the controller in the formulation of the objective function. Most modern industrial CD controllers are MPC and if any of the constraints is active, the controller will become highly complicated and even nonlinear.

The presence of a nonlinear controller in the control loop will add to the complexity of closed-loop optimal input design. Thus to simplify this procedure, we introduce the following assumption.

Assumption 2. Throughout this analysis, the MPC is assumed to operate in the linear mode and no constraints are active.

From Assumption 2, the specific expression of the model predictive controller at steady-state for the CD process is known to be, $$K_{ss} = -Q_3^{-1} \alpha_K G_{ss} Q_1, \quad (5)$$

where $Q_1$ is the weight matrix in the MPC objective function penalizing the deviation of the CV profile from its set-points. $Q_3$ is the corresponding weight matrix to penalize the offset of the steady-state manipulated variable (MV) from its target. $\alpha_K$ is a constant determined from the dynamic model (2) of the actuators. In practice, for convenience, the weighting matrices $Q_1$ and $Q_3$ are in general selected to be diagonal. From (5), it is observed that the controller $K_{ss}$ will possess a similar structure as the gain $G_{ss}$. Awareness of this important point will greatly facilitate the proceedings of the derivations in the sequel.

Figure 4:
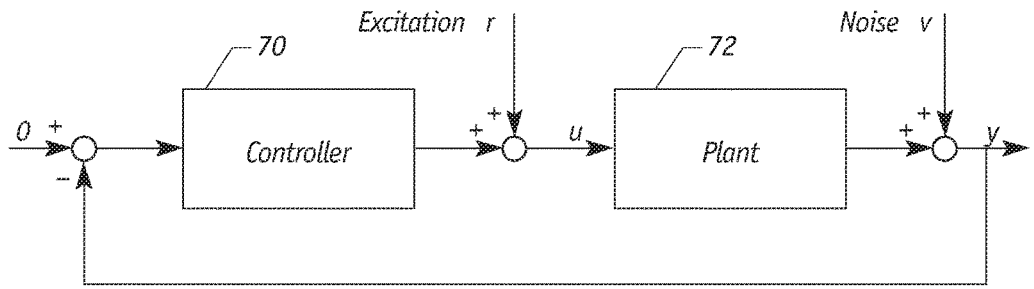
FIG. 4 illustrates a closed-loop optimal input design configuration.

Combining (4) and (5), from FIG. 4, we can easily arrive at the closed-loop models of the CD process, $$Y_{ss}=(I+G_{ss}K_{ss})^{-1}G_{ss}K_{ss}r+(I+G_{ss}K_{ss})^{-1}v_{ss}, \quad (6)$$

$$u_{ss}=(I+K_{ss}G_{ss})^{-1}r-(I+K_{ss}G_{ss})^{-1}K_{ss}v_{ss}, \quad (7)$$

where $r \in \mathbb{R}^m$ is the spatial excitation signal to be designed.

C. Spatial Optimal Input Design for the CD Process

When it comes to the spatial optimal input, the parameters of interest for the CD process model will be those in the gain matrix $G_{ss}$ (or more specifically, the parameters in a column of $G_{ss}$). Notice that the optimal input design directly based on the closed-loop model (6)-(7) is nontrival due to the large input-output dimensions as well as the large number of parameters in $G_{ss}$. To avoid this issue, we propose to use a scalar transfer function along the spatial coordinate to represent the spatial response of the actuators. In this sense, the original optimal input design aimed for the MIMO CD model can be re-formulated into that for a scalar spatial model, which significantly reduces the associated complexity. However, the price to pay is that the scalar spatial transfer function will have to be non-causal as any bumped actuator will generate responses on two sides (see FIG. 5), analogous to the 'past' and 'future' for the conventional time coordinate. The following section will demonstrate the specific algorithms of converting the CD steady-state process model $G_{ss}$ and controller $K_{ss}$ into the scalar no causal then further into the causal transfer function form.

II. Causal Scalar Transfer Function Representation of the CD Process

In this section, we show the procedures to develop causal-equivalent models for both the CD closed-loop model and open-loop model. Let us focus on the steady-state process model $G_{ss}$ since the steady-state controller matrix $K_{ss}$ will follow the same vein as long as it possesses a similar structure as $G_{ss}$.

A. Non-causal Transfer Function Form of the Closed-loop CD Process

From the aforementioned structure of the $G_{ss}$ as well as Assumption 1, one is readily able to extract a scalar non-causal FIR model from any single column of $G_{ss}$ to represent the spatial impulse response of the actuator, $$g(\lambda,\lambda^{-1})=g_{-n}\lambda^{-n}+\ldots+g_0+\ldots+g_n\lambda^n, \quad (8)$$

where $\lambda$ is the spatially forward-shift operator. The positive and negative powers of $\lambda$ denote the anti-causal and causal shift. The $g_i$, $i=-n, \ldots, n$, are the spatial impulse response coefficients of each single actuator and in general the symmetry of the impulse response is enforced, i.e., $g_i=g_{-i}$. As in most cases, the noncausal FIR model (8) will have a high order (i.e., n normally is large), a parsimonious non-causal transfer function is necessary to simplify this model. Before we show that, the following assumption is posed.

Assumption 3. The CD MIMO steady-state models (e.g., $G_{ss}$ and $K_{ss}$ are Toeplitz-structured, and the corresponding spatial impulse response sequence satisfies the Wiener-Hopf factorization conditions: real, symmetric, and taking $G_{ss}$ as an example, $$g_{-n}\lambda^{-n}+\ldots+g_0+\ldots+g_n\lambda^n=M(\lambda)M(\lambda^{-1}), \forall \omega, \quad (9)$$

where $\lambda=e^{j\omega}$. Here $M(\lambda)$ has the following expression, $$M(\lambda)=m_0+m_1\lambda^{-1}+\ldots+m_n\lambda^n, \quad (10)$$

where $m_i$, $i=1, \ldots n$, are the coefficients.

An immediate observation is that the frequency response of the left-hand side of (9) is non-negative and real for any frequency, which places certain restrictions on the scope of the possible spatial impulse response shapes that we may investigate. However, industrial experience reveals that most actual actuator response shapes are able to satisfy this condition. The relationship between $G_{ss}$ and $K_{ss}$ from (5) affirms that if $G_{ss}$ satisfies (5) then so does $K_{ss}$.

After obtaining the causal FIR model $M(\lambda^{-1})$, the next step would be to find a parsimonious transfer function model (e.g. output error model) to represent $M(\lambda^{-1})$. This process can be accomplished from the system identification toolbox in Matlab and the original noncausal $g(\lambda, \lambda^{-1})$ is re-written as follows, $$\bar{g}(\lambda, \lambda^{-1}) = \frac{B(\lambda)B(\lambda^{-1})}{A(\lambda)A(\lambda^{-1})} \quad (11)$$

$$B(\lambda) = b_0 + b_1\lambda^{-1} + \ldots + b_{n_b}\lambda^{-n_b}, \quad (12)$$

$$A(\lambda) = 1 + a_1\lambda^{-1} + \ldots + a_{n_a}\lambda^{-n_a}, \quad (13)$$

where $n_a$ and $n_b$ are the orders of $B(\lambda^{-1})$ and $A(\lambda^{-1})$, respectively. In a similar fashion, the noncausal transfer function form of the controller is achieved to be, $$\bar{k}(\lambda, \lambda^{-1}) = \frac{F(\lambda)F(\lambda^{-1})}{E(\lambda)E(\lambda^{-1})} \quad (14)$$

$$F(\lambda^{-1}) = f_0 + f_1 + \ldots + f_{n_f}\lambda_f^{-n_f}, \quad (15)$$

$$E(\lambda^{-1}) = 1 + e_1\lambda^{-1} + \ldots + e_{n_e}\lambda_e^{-n_e}, \quad (16)$$

where $n_e$ and $n_f$ are the orders of $E(\lambda^{-1})$ and $F(\lambda^{-1})$, respectively. From (11)-(16), the original high-dimensional MIMO steady-state closed-loop model (6)-(7) can be replaced by scalar but non-causal transfer functions, $$y_{ss}(x) = \frac{\bar{g}}{1+\bar{g}\bar{k}}r(x) + \frac{1}{1+\bar{g}\bar{k}}v_{ss}(x), \quad (17)$$

$$u_{ss}(x) = \frac{\bar{g}}{1+\bar{g}\bar{k}}r(x) - \frac{\bar{k}}{1+\bar{g}\bar{k}}v_{ss}(x), \quad (18)$$

where x stands for the spatial coordinate. Note that the input and output sensitivity functions have the same non-causal transfer function representation as shown in the above equations.

B. Causal Equivalent Closed-loop Models

Up to now, the closed-loop scalar non-causal model of the CD process (17)-(18) is still not a convenient form for further processing such as the optimal input design. In this subsection, we will develop methods to find causal equivalent models for the non-causal transfer functions such as $\bar{g}(\lambda, \lambda^{-1})$. First, the following Lemma is necessary.

Lemma 1. Suppose that $\bar{g}_1(\lambda, \lambda^{-1})$ and $\bar{g}_2(\lambda, \lambda^{-1})$ satisfy the Wiener-Hopf factorization conditions. Then the sum $\bar{g}_1(\lambda, \lambda^{-1}) + \bar{g}_2(\lambda, \lambda^{-1})$ can also satisfy these conditions.

Proof. Since $\bar{g}_1(\lambda, \lambda^{-1})$ and $\bar{g}_2(\lambda, \lambda^{-1})$ satisfy (9), we have, $$\bar{g}_1(e^{j\omega}, e^{-j\omega}) \geq 0, \forall \omega,$$

$$\bar{g}_2(e^{j\omega}, e^{-j\omega}) \geq 0, \forall \omega,$$

Thus it follows that, $$\bar{g}_1(e^{j\omega}, e^{-j\omega}) + \bar{g}_2(e^{j\omega}, e^{-j\omega}) \geq 0, \forall \omega. \tag{19}$$

Besides, the coefficient sequence of (19) is real and symmetric. Thus one is always able to find an $M(\lambda)$ such that (9) is satisfied. This ends the proof.

Defining $$\bar{S} = \frac{1}{1 + \bar{g}\bar{k}}$$

from (17)-(18), we have, $$\bar{S} = \frac{A(\lambda)A(\lambda^{-1})E(\lambda)E(\lambda^{-1})}{A(\lambda)A(\lambda^{-1})E(\lambda)E(\lambda^{-1}) + B(\lambda)B(\lambda^{-1})F(\lambda)F(\lambda^{-1})} \tag{20}$$

From Lemma 1, it follows that the denominator of (20) can be factorized to be the product of a causal FIR filter and its anti-causal form. Therefore, the closed-loop transfer functions (17)-(18) are simplified to be, $$y_{ss}(x) = \bar{S}_1(\lambda, \lambda^{-1})r(x) + \bar{S}_2(\lambda, \lambda^{-1})v_{ss}(x), \tag{21}$$

$$u_{ss}(x) = \bar{S}_2(\lambda, \lambda^{-1})r(x) - \bar{S}_3(\lambda, \lambda^{-1})v_{ss}(x), \tag{22}$$

where $\bar{S}_i(\lambda, \lambda^{-1})$, $i=1,2,3$, has a similar structure as (11) and (14). Further notice that $\phi$ can also be represented by a noncausal transfer function as is assumed in the previous sections. In other words, the spatial noise $v_{ss}$ has the following expression, $$v_{ss}(x) = \bar{h}(\lambda, \lambda^{-1})e(x) = \frac{D(\lambda)D(\lambda^{-1})}{C(\lambda)C(\lambda^{-1})}, \tag{23}$$

where $\{e(x)\}$ is a spatial white noise sequence. To find a causal-equivalent transfer function for (21)-(23), we establish the following theorem.

Theorem 1. Consider a stochastic process with the output sequence $\{y(x), x=1, \ldots, m\}$ (in the sequel, the subscript is omitted and the argument x is used to indicate the steady-state and output sequence) generated according to the following non-causal Box-Jenkins model $$y(x) = \frac{M(\lambda)M(\lambda^{-1})}{N(\lambda)N(\lambda^{-1})}r(x) + \frac{R(\lambda)R(\lambda^{-1})}{S(\lambda)S(\lambda^{-1})}e(x), \tag{24}$$

where $\{e(x), x=1, \ldots, m\}$ is a Gaussian white noise sequence. The polynomials with arguments $\lambda^{-1}$ and $\lambda$ are the causal and anti-causal parts, respectively. Assume that all the polynomials have no zeros on the unit circle and are minimum phase. Then there exist causal polynomials $\tilde{M}_y(\lambda^{-1})$, $\tilde{N}_y(\lambda^{-1})$, $\tilde{R}_y(\lambda^{-1})$, $\tilde{S}_y(\lambda^{-1})$ and a white noise sequence $\{\tilde{e}_y(x)\}$ as well as a stochastic sequence $\{\tilde{y}(x)\}$ which has the same spectra as $\{y(x)\}$ such that, $$\tilde{y}(x) = \frac{\tilde{M}_y(\lambda^{-1})}{\tilde{N}_y(\lambda^{-1})}r(x) + \frac{\tilde{R}_y(\lambda^{-1})}{\tilde{S}_y(\lambda^{-1})}\tilde{e}_y(x). \tag{25}$$

Proof. If multiplying both sides of (24) by using $N(\lambda)N(\lambda^{-1})S(\lambda)S(\lambda^{-1})$, we can obtain, $$N(\lambda)N(\lambda^{-1})S(\lambda)S(\lambda^{-1})y(x) = M(\lambda)M(\lambda^{-1})S(\lambda)S(\lambda^{-1})r(x) + N(\lambda)N(\lambda^{-1})R(\lambda)R(\lambda^{-1})e(x), \tag{26}$$

Define the roots of the anti-causal polynomials $M(\lambda^{-1})$, $N(\lambda^{-1})$, $R(\lambda^{-1})$, $S(\lambda^{-1})$ to be, respectively, $\alpha_i$, $\beta_i$, $\gamma_i$ and $\delta_i$. Let $$\pi_M = \Pi_i \frac{\lambda^{-1} - \alpha_i}{\lambda - \alpha_i},$$

$$\pi_N = \Pi_i \frac{\lambda^{-1} - \beta_i}{\lambda - \beta_i},$$

$$\pi_R = \Pi_i \frac{\lambda^{-1} - \gamma_i}{\lambda - \gamma_i},$$

$$\pi_S = \Pi_i \frac{\lambda^{-1} - \delta_i}{\lambda - \delta_i}.$$

Notice that $N(\lambda)\pi_N = N^2(\lambda^{-1})$ and the same also holds for $M(\lambda)$, $R(\lambda)$ and $S(\lambda)$. Multiplying both sides of (26) by $\pi_m\pi_s$, after some manipulations, one can obtain, $$N^2(\lambda^{-1})S^2(\lambda^{-1})\tilde{y}(x) = M^2(\lambda^{-1})S^2(\lambda^{-1})r(x) + R^2(\lambda^{-1})\tilde{e}_y(x), \tag{27}$$

where $$\tilde{y}(x) = \frac{\pi_M}{\pi_N}y(x), \tag{28}$$

$$\tilde{e}_y(x) = \frac{\pi_M \pi_S}{\pi_N \pi_S}e(x)$$

Since $\pi_M$, $\pi_N$, $\pi_R$, and $\pi_s$ are all-pass filters, $\{\tilde{e}_y(x)\}$ is a white noise sequence with the same spectra as $\{e(x)\}$ but may correspond to different realizations. Besides, $\{\tilde{y}(x)\}$ has the same spectra as $\{y_{ss}(x)\}$. Therefore, (25) is verified by pairing $\tilde{M}(\lambda^{-1}) = M^2(\lambda^{-1})$ and so on with (27), which ends this proof.

Remark 1. From Theorem 1, one may interpret that the equivalence between $\{\tilde{y}(x)\}$ and $\{y(x)\}$ is in terms of the spectra, although the realizations might be different. However, this equivalence greatly facilitates the maximum likelihood estimation for the original noncausal model by reducing it into a causal-equivalent form. The rationale of performing in this way is based on the conclusion that the log-likelihood function for the non-causal model and the causal model converge to be the same with probability one as the sample number tends to infinity, which can also be extended to the non-causal Box-Jenkins model in (24).

Similarly, the input signal $u_{ss}(x)$ in (22) can also be represented through causal filters, $$\tilde{u}(x) = \frac{\tilde{M}_u(\lambda^{-1})}{\tilde{N}_u(\lambda^{-1})}r(x) + \frac{\tilde{R}_u(\lambda^{-1})}{\tilde{S}_u(\lambda^{-1})}\tilde{e}_u(x), \tag{29}$$

where $\{\tilde{u}(x)\}$ and $\{u_{ss}(x)\}$ have the same spectra. The equations (25) and (29) will be necessary for the optimal input design in the sequel.

C. Covariance Matrix Equivalence of the Causal and Non-causal Model Parameter Estimates It is well known that if the white noise is Gaussian distributed, the prediction error method with properly chosen criterion will coincide with the maximum likelihood estimation. It has been shown that, for the open-loop data, the log-likelihood function of the non-causal ARX model and that of the corresponding causal ARX model will converge to the same value as the sample number tends to infinity. In this subsection, we will demonstrate a similar statement for the closed-loop data.

Theorem 2. Let us consider the following non-causal process model (θ is the parameter in a compact set Ω), $$y(x) = \bar{g}(\lambda, \lambda^{-1}, \theta) u(x) + \bar{h}(\lambda, \lambda^{-1}, \theta) e(x), \quad (30)$$

where $\bar{g}$ was defined in (11)-(13) and $\bar{h}$ was defined in (23). e (x) is Gaussian white noise. Suppose that the data is generated in the closed-loop with controller model (14)-(16) and that all the relevant transfer functions are stable. Denote $\mathcal{L}_y(y)$ as the log-likelihood function of the non-causal model (30) and $\mathcal{L}_{\tilde{y}}(\tilde{y})$ as the log-likelihood function of the causal-equivalent model of (30) obtained similarly as (25). We have, as m→∞, $$\sup_{\theta \in \Omega} |\mathcal{L}_y(y) - \mathcal{L}_{\tilde{y}}(\tilde{y})| \to 0, \, w.p.1,$$

$$\sup_{\theta \in \Omega} \left\| \frac{d\mathcal{L}_y(y)}{d\theta} - \frac{d\mathcal{L}_{\tilde{y}}(\tilde{y})}{d\theta} \right\| \to 0, \, w.p.1$$

Remark 2. Theorem 2 implies that both the log-likelihood function and its derivative with respect the parameter θ obtained from the original noncausal model and the causal model are identical asymptotically. Therefore, we can conclude that the parameter covariance matrices from the two schemes coincide, and hence we may perform the optimal input design based on the causal model.

III. Closed-Loop Optimal Input Design

The optimal input design in the closed-loop for the steady-state CD process model was investigated. The emphasis will be placed on the non-causal CD process model due to the drawbacks associated with the MIMO CD closed-loop model (6)-(7). The actual implementation of the input design will be on the causal equivalent CD closed-loop model due to Theorem 2.

Note that in practice, the noise model parameters are of less interest and thus we split the parameter θ to be θ = $[\rho^T \eta^T]^T$, where ρ is the process model parameter vector and η is the noise model parameter vector. For the input design, the focus will be on minimizing the covariance of ρ only. Based on this motivation, due to Theorem 2, the parameter covariance matrix of ρ, $P_\rho$, is expressed as, $$P_\rho \sim \frac{1}{m} \left[ \frac{1}{2\pi \lambda_0} \int_{-\pi}^{\pi} \frac{1}{|\tilde{h}(e^{j\omega}, \eta_0)|^2} \frac{\partial \tilde{g}(e^{j\omega}, \rho_0)}{\partial \rho} \Phi_{\tilde{u}}(\omega) \frac{\partial \tilde{g}^T(e^{-j\omega}, \rho_0)}{\partial \rho} d\omega \right]^{-1}, \quad (31)$$

where $\lambda_0$ is the variance of the noise $\tilde{e}_y(x)$. $\tilde{g}$ and $\tilde{h}$ are the causal equivalent forms of $\bar{g}$ and $\bar{h}$, respectively. The input spectrum $\Phi_{\tilde{u}}(\omega)$, according to (29), is related to the excitation spectrum $\Phi_r(\omega)$ via, $$\Phi_{\tilde{u}}(\omega) = \left| \frac{\tilde{M}_u(e^{-j\omega})}{\tilde{N}_u(e^{-j\omega})} \right|^2 \Phi_r(\omega) + \left| \frac{\tilde{R}_u(e^{-j\omega})}{\tilde{S}_u(e^{-j\omega})} \right|^2 \lambda_0. \quad (32)$$

The closed-loop optimal input design can be formulated as minimizing a function of the parameter covariance $P_\rho$ subject to a set of constraints, e.g., input and output power constraints, $$\min_{\Phi_r(\omega)} f_0(P_\rho(\Phi_r(\omega))) \quad (33)$$

$$s.t. \frac{1}{2\pi} \int_{-\pi}^{\pi} \Phi_u(\omega) d\omega \le c_u, \quad (34)$$

$$\frac{1}{2\pi} \int_{-\pi}^{\pi} \Phi_y(\omega) d\omega \le c_y, \quad (35)$$

where $c_u$ and $c_y$ are the limits on the input signal power and output signal power. The constraints (34)-(35) can be written in terms of the design variable $\Phi_r(\omega)$ by (32) and (25), respectively. As this optimization problem is still infinite-dimensional (since $\Phi_r(\omega)$ is a continuous function of ω), a technique known as the finite dimensional parameterization can be employed to reduce it into finite-dimensional case. Specifically, $\Phi_r(\omega)$ can be parameterized by the definition of a spectrum, $$\Phi_r(\omega) = \sum_{k=-m_c}^{m_c} c_k e^{-j\omega k} \ge 0, \, \forall \, \omega, \quad (36)$$

where $c_k$, k = −$m_c$, . . . , $m_c$, are the parameters, and $m_c$ is the selected number of parameters. With (36), the original optimization problem can be cast into one with finite number of parameters. It is worth pointing out that the non-negativity of the parameterized spectrum (36) at any frequency has to be satisfied while searching for the optimal $c_k$. This requirement is fulfilled by the KYP lemma by constructing a controllable and observable state-space realization for the spectrum. After these treatments, we will obtain a neat and solvable convex optimization (choose $f_0(\cdot)$ to be convex) problem which can be readily solved by the off-the-shelf solvers such as the CVX toolbox.

Remark 3. Note that the aforementioned optimal input design only considers the power constraints on the input and output (34)-(35). However, in practice, the hard constraints on the CVs and MVs make more sense and this is still an open problem for the frequency-domain optimal input design as posed above. Besides, specific to the CD process, the second-order bending constraints preventing the 'picketing' on the actuators are also important.

IV. Case Study

A simulation example was used to validate the proposed CD process model identification and closed-loop optimal input design methods. In particular, the effect of the optimally designed input on the identification was compared with that of the bumped excitation that is currently employed in the industry as described in Chu et al. U.S. Pat. No. 8,224,476 to Chu et al., which is incorporated herein.

Figure 5A:
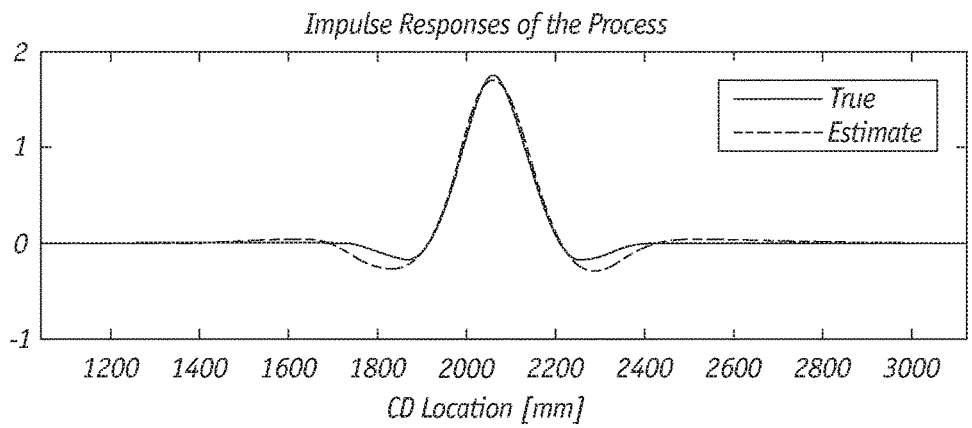
FIGS. 5A and 5B depict the impulse response of a single actuator (solid line) and the impulse response of the estimated non-causal transfer function (dash dotted line)
Figure 5B:
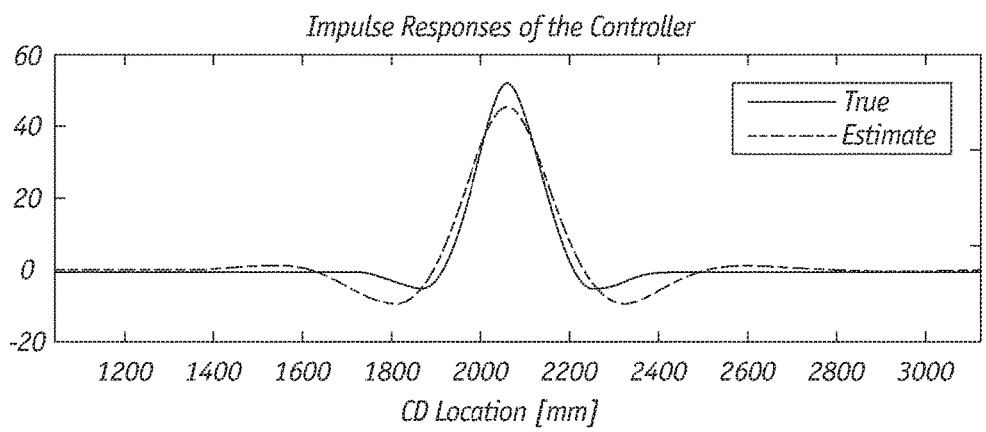

In practice, the spatial response shape of a single actuator is assumed to satisfy the following nonlinear equation, $$g_s(x) = \frac{y}{2} \left\{ e^{\frac{a(x+\beta\xi)^2}{\xi^2}} \cos\frac{\pi(x+\beta\xi)}{\xi} + e^{-\frac{a(x-\beta\xi)^2}{\xi^2}} \cos\frac{\pi(x+\beta\xi)}{\xi} \right\} \quad (37)$$

where $\gamma$, $\xi$, $\beta$, $\alpha$ represent the gain, width, divergence and attenuation, respectively. x is the spatial coordinate. In this example, these parameters are specified with values, respectively, $\gamma=0.3802$, $\xi=268.6414$ mm, $\beta=0.10$, $\alpha=3.5$. The response shape under impulse signal of amplitude 5 is illustrated as the solid curve in the plot of FIG. 5A. For convenience, we assume that the CD process has 222 actuators and measurement bins. The controller is chosen to be CD-MPC with prediction horizon 25 samples and control horizon 1 sample (sampling interval is 12 seconds). The weighting matrices in the cost function is selected to be $Q_1=0.4I$, and $Q_3=0.1667I$. The $\alpha_K$ in (5) is computed to be 12.3212. From the above discussion of the development of the causal-equivalent models, one is able to obtain a non-causal scalar model for the CD process and the controller, respectively. The impulse response curves of these non-causal models are shown in FIGS. 5A and 5B in the dash-dotted curves. Noting that here for simplicity, we select $n_b=n_f=1$, $n_a=n_e=2$ and higher orders will improve the fitting performance but will also increase the computation of the optimal input design. The noise variance is chosen to be 0.1 with noise model $\phi=1$ (output-error structure). Notice that the small process gain (the causal-equivalent model has even smaller gain) requires large excitation signal for a good signal-to-noise ratio.

Figure 6A:
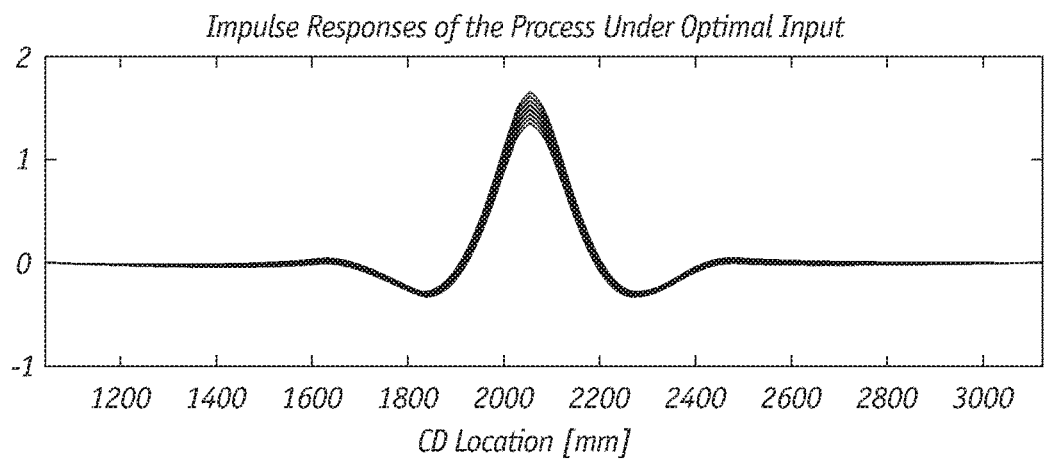
FIGS. 6A and 6B depict the impulse responses of the estimated process model in the closed-loop under the optimally designed input (FIG. 6A) and the bumped input (FIG. 6B) in 100 Monte-Carlo simulations.
Figure 6B:
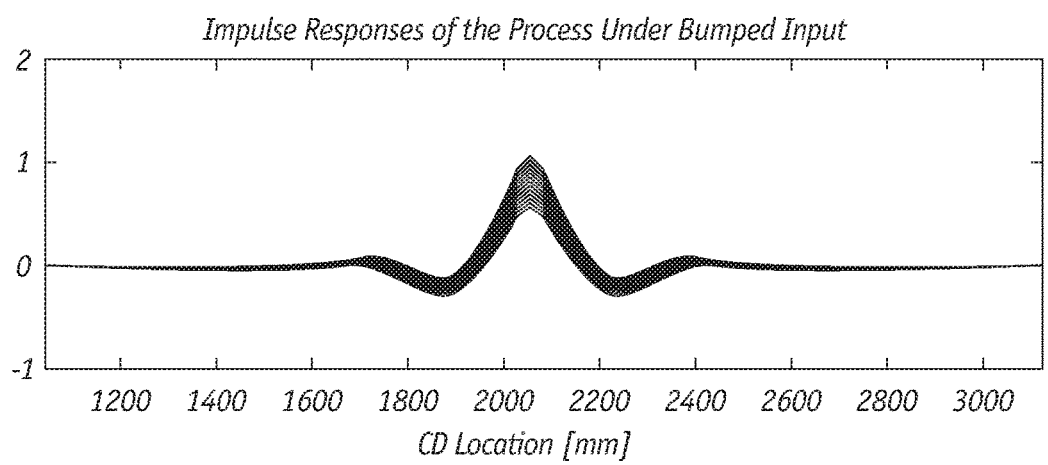

To make the comparison between the optimal excitation signals with the bumped excitation meaningful, we set a hard constraint ±10 on the amplitude of the excitation signals. For the optimally designed input, if any part of its amplitude violates this constraint, we will set that part to be saturated on this bound. For the bumped signal, the amplitude of the bumps alternate between –10 and 10. To achieve this goal, we carefully choose $c_u=4$ and $c_y=0.2$. The plot in FIG. 6A shows the impulse responses of the estimated models in 100 Monte-Carlo simulations. The plot in FIG. 6B shows the corresponding results from another 100 simulations under bumped excitation signal. From FIGS. 6A and 6B, the impulse responses of the estimated models from the bumped signal have large variance and the estimated gains are not precise. However, the estimates from the optimal input demonstrate smaller variance and the gains are more accurate. Therefore, the designed optimal input outperforms the bumped excitation signals in this example in terms of the closed-loop identification performance.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

What is claimed is:

1. A method of closed-loop identification of process models for the model predictive control (MPC) by a profile analyzer, of an industrial sheetmaking system having a plurality of actuators arranged in the cross-direction (CD) and a scanning sensor supported on a supporting frame wherein the profile analyzer manipulates the actuators to control the sheet parameters in a spatially distributed sheet process, the method comprises the steps of:
    (a) receiving from the scanning sensor, data indicative of the magnitude of a measured sheet property of the spatially-distributed sheet process;
    (b) selecting by the profile analyzer a process model for the spatially-distributed sheet process wherein the process model is defined by a matrix;
    (c) converting the matrix into a non-causal transfer function;
    (d) converting the non-causal transfer function into a causal model that has an equivalent spectrum;
    (e) using the causal model to design an optimal input spectrum for process excitation;
    (f) transforming a frequency domain representation of the optimal input spectrum to a time domain realization which is a sequence of actuator movements;
    (g) providing signals by the profile analyzer to the plurality of actuators, of the sequence of actuator movements and collecting data via the scanning sensor changes in cross-directional sheet properties due to the sequence of actuator movements to determine measured actuator response profiles;
    (h) analyzing by the profile analyzer, the data to extract new model parameters; and
    (i) using the new model parameters for selecting the process model.

2. The method of claim 1 wherein the matrix defines steady-state gains between actuator positions and spatially distributed process measurements.

3. The method of claim 1 wherein step (a) comprises of using an initial process model that is an existing process model or that is a developed process model to approximate process behavior wherein the initial process model allows for the design of an excitation sequence that is tailored to a specific process of interest.

4. The method of claim 1 wherein step (b) a non-causal spatial finite impulse response model is generated by taking parameters from a single column of a spatial gain matrix and the non-causal spatial impulse response model is factored into a causal transfer function and an identical but anti-causal transfer function.

5. The method of claim 1 wherein step (c) comprises taking the square of the causal transfer functions.

6. The method of claim 1 wherein in step (d) an input spectrum is designed to minimize the covariance of parameter estimates of the causal-equivalent model subject to constrains on input and output power.

7. The method of claim 6 wherein in step (d) to minimize the covariance of parameter estimates of the causal-equivalent model comprises making a finite dimensional parameterization of the input spectrum.

8. The method of claim 1 wherein the process model for the spatially-distributed process is with respect to one actuator array and a corresponding measurement array.

9. The method of claim 1 wherein the spatially-distributed sheetmaking process is a paper-making process.

10. A profile analyzer for providing multivariable model predictive control (MPC) to a cross-direction (CD) process having at least one manipulated actuator array and a scanning sensor supported on a supporting frame, and at least one controlled measurement array, wherein the profile analyzer manipulates the actuators to control the sheet parameters in a spatially distributed sheet process the profile analyzer comprises a processor that is configured to:

receive from the scanning sensor, data indicative of the magnitude of a measured sheet property of the spatially-distributed sheet process;

select a process model for the spatially-distributed sheet process wherein the process model is defined by a matrix;

convert the matrix into a non-causal transfer function;

convert the non-causal transfer function into a causal model that has an equivalent spectrum;

use the causal model to design an optimal input spectrum for process excitation;

transform a frequency domain representation of the optimal input spectrum to a time domain realization which is a sequence of actuator movements;

provide, signals to the plurality of actuators, of the sequence of actuator movements and collecting data via the scanning sensor changes in cross-directional sheet properties due to the sequence of actuator movements to determine measured actuator response profiles;

analyze the data to extract new model parameters; and use the new model parameters for the process model.

11. The system of claim 10 wherein the matrix defines steady-state gains between actuator positions and spatially distributed process measurements.

12. The system of claim 10 wherein the MPC employs an initial process model that is an existing process model or that is a developed process model to approximate process behavior wherein the initial process model allows for the design of an excitation sequence that is tailored to a specific process of interest.

13. The system of claim 10 wherein the processor is configured to convert the matrix into a non-transfer function whereby a non-causal spatial finite impulse response model is generated by taking parameters from a single column of a spatial gain matrix and the non-causal spatial impulse response model is factored into a causal transfer function and an identical but anti-causal transfer function.

14. The system of claim 10 wherein the processor is configured to convert the non-causal transfer function into a causal model that has an equivalent spectrum by taking the square of the causal transfer functions.

15. The system of claim 10 wherein the processor is configured to use the causal model to design an optimal input spectrum for process excitation whereby an input spectrum is designed to minimize the covariance of parameter estimates of the causal-equivalent model subject to constrains on input and output power.

16. The system of claim 15 wherein to minimize the covariance of parameter estimates of the causal-equivalent model comprises making a finite dimensional parameterization of the input spectrum.

17. The system of claim 10 wherein the process model is with respect to one manipulated actuator array and a corresponding measurement array.

18. A non-transitory computer readable medium embodying a computer program for identifying alternative process models for a profile analyzer having model predictive control (MPC) employed to control a cross-directional process having a manipulated actuator array comprising a plurality of actuators and at least one controlled measurement array, and a scanning sensor supported on a supporting frame, wherein the profile analyzer manipulates the actuators to control the sheet parameters in a spatially distributed sheet process, wherein the program comprises readable program code for:

receiving from the scanning sensor, data indicative of the magnitude of a measured sheet property of the spatially-distributed sheet process;

selecting by the profile analyzer a process model for the spatially-distributed sheet process wherein the process model is defined by a matrix;

converting the matrix into a non-causal transfer function;

converting the non-causal transfer function into a causal model that has an equivalent spectrum;

using the causal model to design an optimal input spectrum for process excitation;

transforming a frequency domain representation of the optimal input spectrum to a time domain realization which is a sequence of actuator movements;

providing signals by the profile analyzer to the plurality of actuators, of the sequence of actuator movements and collecting data via the scanning sensor changes in cross-directional sheet properties due to the sequence of actuator movements to determine measured actuator response profiles;

analyzing by the profile analyzer, the data to extract new model parameters; and using the new model parameters for the process model.

19. The non-transitory computer readable medium of claim 18 wherein the process models are with respect to one actuator array and a corresponding measurement array.

20. The non-transitory computer readable medium of claim 18 wherein the cross-directional process is a papermaking process.

* * * * *